(12) United States Patent
Gao et al.

(10) Patent No.: US 10,936,842 B2
(45) Date of Patent: Mar. 2, 2021

(54) DISPLAY PANEL AND DISPLAY DEVICE (71) Applicant: Shanghai Tianma AM-OLED Co., Ltd., Shanghai (CN)

(72) Inventors: Yana Gao, Shanghai (CN); Xingyao Zhou, Shanghai (CN); Yue Li, Shanghai (CN); Dongxu Xiang, Shanghai (CN); Xinzhao Liu, Shanghai (CN)

(73) Assignee: Shanghai Tianma AM-OLED Co., Ltd., Shanghai (CN)

( * ) Notice: Subject to any disclaimer, the term of this patent is extended or adjusted under 35 U.S.C. 154(b) by 0 days.

(21) Appl. No.: 16/229,479

(22) Filed: Dec. 21, 2018

(65) Prior Publication Data

US 2019/0325186 A1 Oct. 24, 2019

(30) Foreign Application Priority Data

Apr. 20, 2018 (CN) .......................... 201810361328.4

(51) Int. Cl.
G06K 9/00 (2006.01)
G06F 3/041 (2006.01)
G06F 3/044 (2006.01)

(52) U.S. Cl.
CPC ........... *G06K 9/0002* (2013.01); *G06F 3/044* (2013.01); *G06F 3/0412* (2013.01); *G06K 9/001* (2013.01); *G06K 9/0004* (2013.01)

(58) Field of Classification Search
CPC .... G06K 9/0004; G06K 9/0002; G06K 9/001; G06F 3/0412; G06F 3/044
See application file for complete search history.

(56) References Cited

U.S. PATENT DOCUMENTS

2019/0279566 A1* 9/2019 Wang ................... G06K 9/0004

FOREIGN PATENT DOCUMENTS

| CN | 103137616 A | 6/2013 |
| CN | 106847170 A | 6/2017 |
| CN | 107133613 A | 9/2017 |

OTHER PUBLICATIONS

Chinese Office Action for application No. 201810361328.4; dated Jan. 6, 2020.

* cited by examiner

Primary Examiner — Abdul-Samad A Adediran
(74) Attorney, Agent, or Firm — von Briesen & Roper, s.c.

(57) ABSTRACT

Provided are a display panel and a display device. The display panel includes a display assembly and a fingerprint recognition assembly. The display assembly includes a base substrate, a plurality of pixel units disposed on one side of the base substrate and a first scanning line extending along a first direction, each of the plurality of pixel units includes a pixel driving unit and a light-emitting unit disposed on one side of the pixel driving unit facing away from the base substrate, and the light-emitting unit includes a metal anode. The fingerprint recognition assembly is configured to perform fingerprint recognition according to light reflected by a touch object to a fingerprint recognition unit. A vertical projection of the first scanning line on the base substrate and a vertical projection of the metal anode on the base substrate have an overlapping area.

15 Claims, 12 Drawing Sheets

DISPLAY PANEL AND DISPLAY DEVICE

CROSS-REFERENCES TO RELATED APPLICATIONS

This application claims priority to a Chinese patent application No. 201810361328.4 filed on Apr. 20, 2018, disclosure of which is incorporated herein by reference in its entirety.

TECHNICAL FIELD

The present disclosure relates to display technologies and, in particular, to a display panel and a display device.

BACKGROUND

Everyone's skin lines (including a fingerprint) are different in terms of patterns, breakpoints and intersection points, showing uniqueness and remaining unchanged throughout one's life. In view of the above contents, we can identify a person with his fingerprints to verify his real identity by comparing his fingerprints with pre-stored fingerprint data, and that is fingerprint recognition technology. With the development of electronic integrated manufacturing technology, an optical fingerprint recognition technology in the fingerprint recognition technology has begun to enter in our daily life and become the most deeply researched, the most widely applied and the most maturely developed technology in the study of biological detection.

At present, optical fingerprint recognition technology is usually combined with display technology, so that a display panel not only has a normal display function, but also can carry out fingerprint recognition. Therefore, functions of the display panel have been enriched and the security performance of the display panel is improved. However, the compatibility of the optical fingerprint recognition technology and display technology still have a problem, and the display effect of the display panel needs to be further improved.

SUMMARY

The present disclosure provides a display panel and a display device so as to decrease a capacitive coupling between a scanning line and a metal anode, solve the problem where the display panel is not dark in the dark state and the sub-pixels are lighted and improve the display effect.

In a first aspect, the present disclosure provides a display panel. The display panel includes:

a display assembly, which includes a base substrate, a plurality of pixel units disposed on one side of the base substrate and a first scanning line extending along a first direction, where each of the plurality of pixel units includes a pixel driving unit and a light-emitting unit disposed on one side of the pixel driving unit facing away from the base substrate, and the light-emitting unit includes a metal anode; and a fingerprint recognition assembly disposed on one side of the base substrate facing away from the pixel driving unit, where the fingerprint recognition assembly includes at least one fingerprint recognition unit, and the fingerprint recognition unit is configured to perform fingerprint recognition according to light reflected by a touch object to the fingerprint recognition unit; and the pixel driving unit includes a light-emitting reset transistor configured to provide an initial voltage for the light-emitting unit before a display stage, the light-emitting reset transistor includes a gate electrode electrically connected to the first scanning line, a drain electrode electrically connected to a reference voltage, and a source electrode electrically connected to the metal anode. A vertical projection of the first scanning line on the base substrate and a vertical projection of the metal anode on the base substrate have an overlapping area.

The display panel further includes a shield electrode disposed between a film layer in which the first scanning line is disposed and a film layer in which the drain electrode is disposed, the shield electrode is connected to one fixed potential, the shield electrode is insulated from the drain electrode, and a vertical projection of the shield electrode on the base substrate is overlapped with the overlapping area.

In a second aspect, the present disclosure further provides a display device including the display panel provided in the first aspect.

The display panel provided by the present disclosure includes a shield electrode disposed between a film layer in which a first scanning line is located and a film layer in which a drain electrode of a light-emitting reset transistor is located, the shield electrode is insulated from the drain electrode and a vertical projection of the shield electrode on the base substrate is overlapped with a vertical projection of the first scanning line on the base substrate and a vertical projection of a metal anode on the base substrate. Since a potential of the shield electrode is fixed, the influence of potential changes of the first scanning line on potential changes of the metal anode may be reduced. That is, a capacitive coupling between the metal anode and the first scanning line may be decreased, thereby improving the image display influence of the display panel.

DETAILED DESCRIPTION

The present disclosure is further detailed below in combination with the drawings and embodiments. It should be understood that the specific embodiments described herein are merely used to explain the present disclosure rather than limiting the present disclosure. In addition, it should be stated that in order to facilitate the description, merely a part of structures related to the present disclosure rather than the whole structure are illustrated in the drawings.

A display panel provided by the present disclosure has a function of fingerprint recognition and may improve a capacitive coupling between a first scanning line and a metal anode, and improve the image display effect of the display panel. Specifically, the display panel includes a display assembly and a fingerprint recognition assembly. The display assembly includes a base substrate, a plurality of pixel units disposed on one side of the base substrate and a first scanning line extending along a first direction, each of the plurality of pixel units includes a pixel driving unit and a light-emitting unit disposed on one side of the pixel driving unit facing away from the base substrate, and the light-emitting unit includes a metal anode. The pixel driving unit includes a light-emitting reset transistor, and the light-emitting reset transistor is configured to provide an initial voltage for the light-emitting unit before the display stage. The light-emitting reset transistor includes a gate electrode electrically connected to the first scanning line, a drain electrode electrically connected to a reference voltage, and a source electrode electrically connected to the metal anode. A vertical projection of the first scanning line on the base substrate and a vertical projection of the metal anode on the base substrate have an overlapping area. The display panel further includes a shield electrode disposed between a film layer in which the first scanning line is located and a film layer in which the drain electrode is located, the shield electrode is connected to one fixed potential, the shield electrode is insulated from the drain electrode, and a vertical projection of the shield electrode on the base substrate is overlapped with the overlapping area.

Due to relatively poor light transmittance performance of each function film layer of the pixel driving unit or other signal wires (especially metal film layers or metal wires), an area in which each function film layer or other signal wires is disposed is commonly a non-transparent region. For the fingerprint recognition assembly, the smaller the area ratio of the non-transparent area to a transparent area, the better the light transmittance of the display panel, and the more optical signals received by the fingerprint recognition assembly, that is, the stronger the fingerprint recognition signal. In order to improve the overall light transmittance of the display panel and thereby increase the strength of the fingerprint recognition signal, a light shielding film layer is compressed so that the metal anode covers a scanning line connected to a gate electrode of the light-emitting reset transistor, causing an increase of a parasitic capacitance between a connection node between the light-emitting reset transistor and the metal anode and the scanning line. During the rising process of the scanning line, a potential of the connection node also rises, thereby causing the illumination of the light-emitting unit and the problem in which the dark state is not dark and the sub-pixels are unexpectedly lighted.

Exemplarily, the vertical projection of the first scanning line on the base substrate and the vertical projection of the metal anode on the base substrate have the overlapping area and the overlapping area can form a coupling capacitor. When a potential of the first scanning line is in a logic high state, a potential of the metal anode is increased accordingly. That is, the light-emitting unit is lighted in the non-light-emitting stage, causing the problem in which the display panel is not dark in the dark state and the sub-pixels are unexpectedly lighted causing a poor image display effect of the display panel.

In order to solve above-mentioned problems, in this embodiment, the display panel further includes the shield electrode disposed between the film layer in which the first scanning line is located and the film layer in which the drain electrode is located, the shield electrode is insulated from the drain electrode and the vertical projection of the shield electrode on the base substrate is overlapped with the overlapping area. Therefore, the influence of potential changes on the first scanning line on potential changes of the metal anode may be reduced via the shield electrode. That is, due to the existence of the shield electrode, the influence of potential changes of the first scanning line on the potential changes of the metal anode is reduced.

Optionally, the overlapping area is covered by vertical projection of the shield electrode on the base substrate completely, thereby completely shielding the influence of the potential changes of the first scanning line on the potential changes of the metal anode.

Exemplarily, when the potential of the first scanning line is in a logic high state, due to the existence of the shield electrode, the potential of the metal anode is not changed. That is, in the non-light-emitting stage, the light-emitting unit is not be lighted, thereby solving the problem in which the display panel is not dark in the dark state and the sub-pixels are unexpectedly lighted and improving the image display effect of the display panel.

How the present disclosure improves the image display effect of the display panel will be described hereinafter with reference to drawings.

Figure 1:
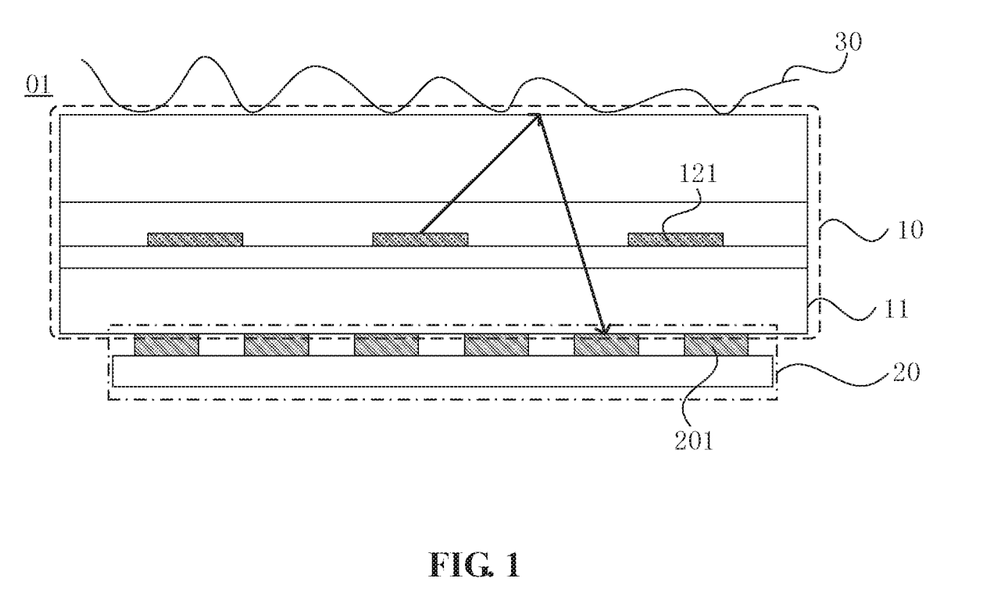
FIG. 1 is a structural diagram showing a display panel according to an embodiment of the present disclosure.

Exemplarily, FIG. 1 is a sectional view of a structure of a display panel according to an embodiment of the present disclosure. Referring to FIG. 1, the display panel 01 includes a display assembly 10 and a fingerprint recognition assembly 20. The display assembly 10 includes a light-emitting unit 121 and the fingerprint recognition assembly 20 is disposed on one side of the base substrate 11 facing away from the light-emitting unit 121. The fingerprint recognition assembly 20 includes at least one fingerprint recognition unit 201, and the fingerprint recognition unit 201 is configured to perform fingerprint recognition according to light reflected by a touch object 30 to the fingerprint recognition unit 201.

An optical fingerprint recognition method is adopted in the fingerprint recognition unit 201, light reflected from different positions of a fingerprint of the touch object 30 enters into the fingerprint recognition unit 201, and the light reflected from the fingerprint is received by the fingerprint recognition unit 201 so as to generate electrical signals related to features of the fingerprint. A concave-convex changed texture (a valley and a ridge) exists in the fingerprint, and since a refractive index of a finger is almost the same as that of the display panel, when light emitted from a light source of the fingerprint recognition unit 20 arrives at a surface where the ridge of the fingerprint contacts with the display panel, the light directly enters into the finger, and when light emitted from a light source of the fingerprint recognition unit 201 arrives at a surface where the valley of the fingerprint contacts with the display panel, the light is reflected or even totally reflected. The light arriving at the valley of the fingerprint may be detected by the fingerprint recognition unit 201, so that the features of the touch object 30 can be reflected by whether there are feedback electrical signals or not in the fingerprint recognition unit 201. Therefore, a function of fingerprint recognition of the display panel is achieved.

Exemplarily, an electrical signal fed back by the fingerprint recognition unit 201 may be a current signal or a voltage signal.

Optionally, the display panel 01 further includes a light source of the fingerprint recognition unit 20. In practical configuration, the light-emitting unit 121 may be utilized to provide a light source for the fingerprint recognition unit 20, or an external-type fingerprint recognition light source is arranged in the display panel 01.

Exemplarily, referring to FIG. 1, the light-emitting unit 121 provides a light source for the fingerprint recognition assembly 20, the fingerprint recognition unit 201 is configured to perform fingerprint recognition according to light emitted from the light-emitting unit 121 and reflected by the touch object 30 to the fingerprint recognition unit 201.

In such way, the light-emitting unit 121 is reused as a light source of the fingerprint recognition assembly 20, so that an extra light source is not required to be configured, thereby simplifying the structure of the display panel 01 and decreasing both the manufacturing cost and manufacturing difficulty of the display panel 01.

Figure 2:
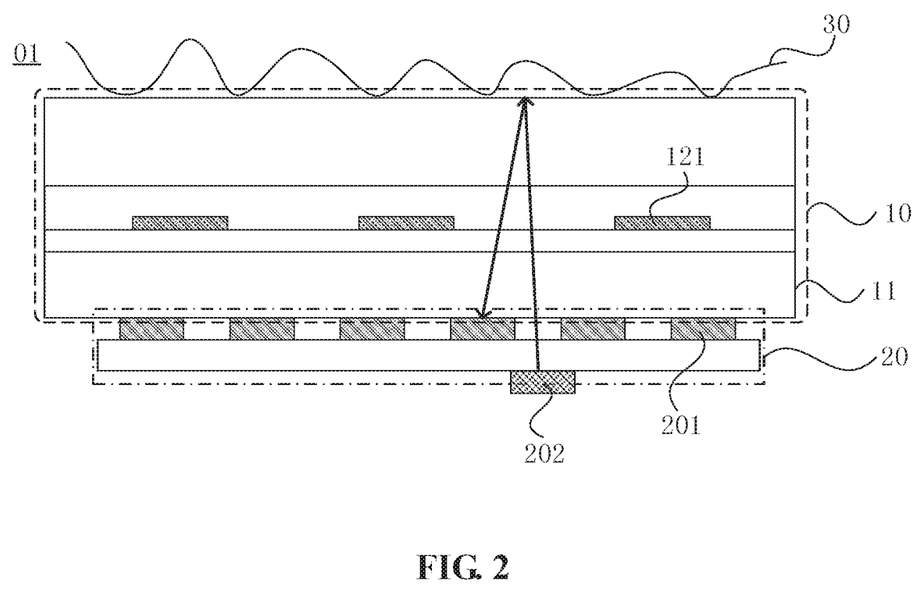
FIG. 2 is a structural diagram showing another display panel according to an embodiment of the present disclosure.

Exemplarily, FIG. 2 is a sectional view of a structure of another display panel according to an embodiment of the present disclosure. The structure of a display panel with an external-type fingerprint recognition light source is shown in FIG. 2. Referring to FIG. 2, a fingerprint recognition light source 202 is disposed on one side of the fingerprint recognition assembly 20 facing away from the base substrate 10, light emitted from the fingerprint recognition light source 202 is irradiated to the touch object 30 via a gap between two adjacent fingerprint recognition units 201, and the fingerprint recognition unit 201 is configured to perform fingerprint recognition according to light emitted from the fingerprint recognition light source 202 and reflected by the touch object 30 to the fingerprint recognition unit 201.

In such way, a light source used for the image display of the display panel 01 and a light source used for fingerprint recognition are separately disposed, thereby reducing the mutual influence between the image display and the fingerprint recognition.

Optionally, the fingerprint recognition light source 202 may be a collimated light source.

Light emitted from the collimated light source may parallelly enter into a surface of the touch object, and interferences between various lights are relatively small. That is, light signals entering into the touch object are relatively strong, so that light signals reflected by the touch object are enhanced accordingly. Further, the strength of the light signals received by the fingerprint recognition unit is also enhanced accordingly and the accuracy of the fingerprint recognition is improved.

Optionally, the fingerprint recognition light source 202 may be an infrared light source.

Light emitted from the infrared light source and light emitted from the pixel unit have different wave bands, which enables infrared light signals emitted from the infrared light source and visible light emitted from the pixel unit to be not interfered with each other. That is, an image display function and a fingerprint recognition function of the display panel are not interfered with each other, so that the image display quality of the display panel is improved and the accuracy of the fingerprint recognition is also improved.

It should be noted that the present disclosure is not only applicable to the above-mentioned external-type fingerprint recognition assembly, that is, the fingerprint identification assembly disposed on one side of the base substrate away from the light-emitting unit, and is also applicable to an integrated fingerprint recognition assembly, that is, the fingerprint recognition assembly integrated in the display panel. Optionally, the fingerprint recognition assembly may be integrated in the display assembly and be formed in the same process as other film layers of the display assembly. For example, a switch transistor of the fingerprint recognition assembly may be formed in the same process as a transistor (for example, a light-emitting reset transistor) of the pixel driving unit.

Optionally, in this embodiment, a pixel driving unit includes a storage capacitor, a second scanning line extending along the first direction and a light-emitting control signal line and the pixel driving unit further includes a data signal writing transistor, a driving transistor, a memory cell reset transistor and a light-emitting control transistor. The second scanning line is electrically connected to a gate electrode of the memory cell reset transistor, the first scanning line is electrically connected to a gate electrode of data signal writing transistor, the light-emitting control signal line is electrically connected to a gate electrode of the light-emitting control transistor, a first plate of the storage capacitor is electrically connected to a first power signal line, and a second plate of the storage capacitor is electrically connected to a gate electrode of the driving transistor. The shield electrode and the first plate of the storage capacitor are located in a same layer. In some optional embodiments, the "pixel driving unit" in the present disclosure is also called as the "pixel driving circuit" in the industry.

Exemplarily, a description is given by taking 7T1C (seven transistors and one storage capacitor) pixel driving circuit as an example in this embodiment.

Figure 3:
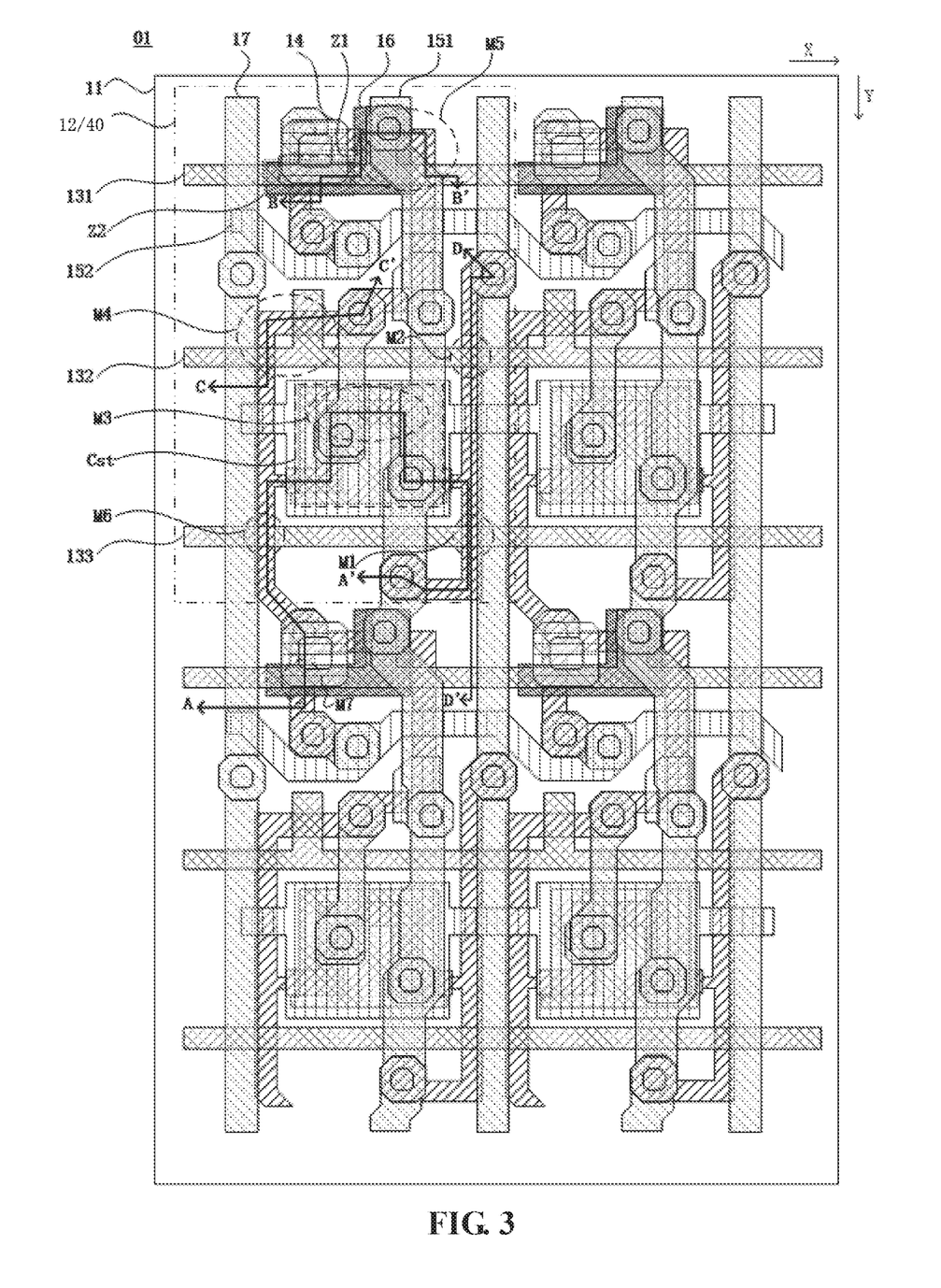
FIG. 3 is a structural diagram showing a layout of a pixel driving unit according to an embodiment of the present disclosure.
Figure 4:
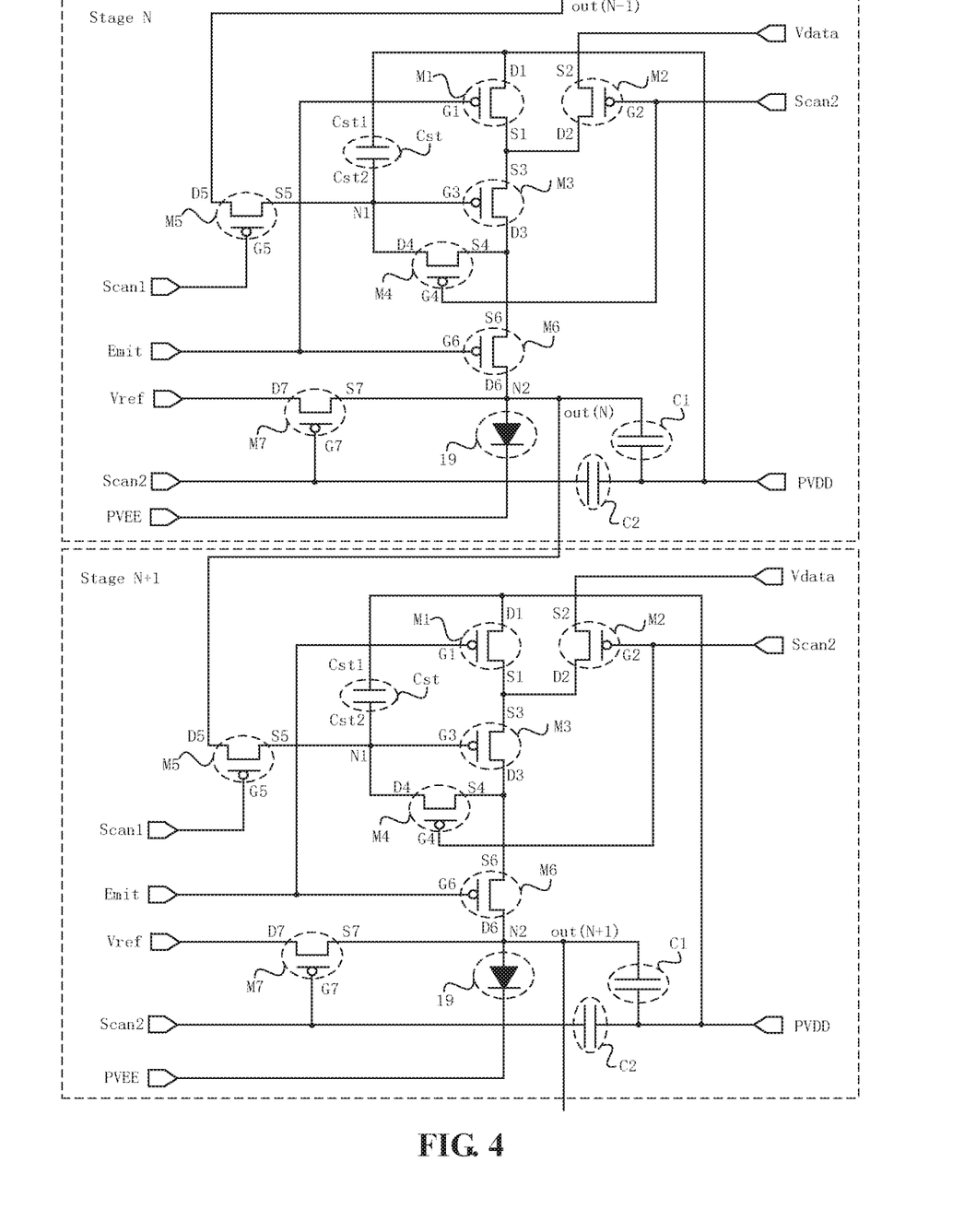
FIG. 4 is a diagram illustrating a circuit structure of the pixel driving unit in FIG. 3.

FIG. 3 is a structural diagram showing a layout of a pixel driving unit according to an embodiment of the present disclosure. FIG. 4 is a diagram illustrating a circuit structure of the pixel driving unit in FIG. 3. A circuit structure of two adjacent rows of the pixel driving units is shown in FIG. 4, where Scan1 is a first scanning signal inputted to the first scanning line 131, Scan2 is a second scanning signal inputted to the second scanning line 132, Emit is a light-emitting control signal inputted to the light-emitting control signal line 133, Vdata is a data signal inputted to a data line 17, Vref is a reference voltage inputted to a reference voltage line, PVDD is a first power signal inputted to the first power signal line 151, and PVEE is a second power signal providing a loop for the light-emitting unit 19. The pixel driving unit 40 may be the circuit in the dashed region of FIG. 3, which is configured to control the light-emitting unit. As shown in FIGS. 3 and 4, a pixel driving unit 40 further includes a data signal writing transistor M2, a driving transistor M3, a memory cell reset transistor M5 and a light-emitting control transistor, and a light-emitting control transistor includes a first light-emitting control transistor M1 and a second light-emitting control transistor M6.

Figure 6:
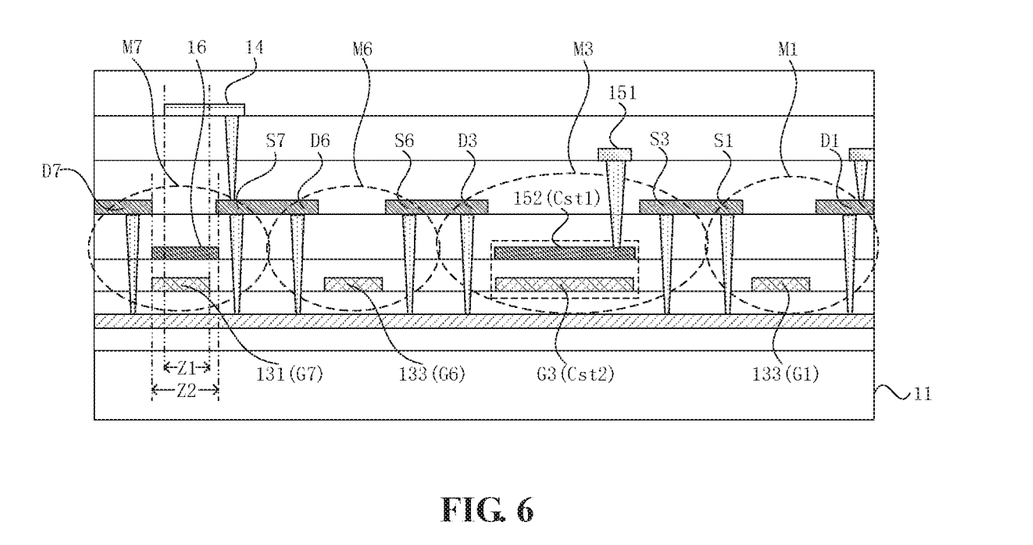
FIG. 6 is a sectional view taken along a line A-A' of FIG. 3.
Figure 10:
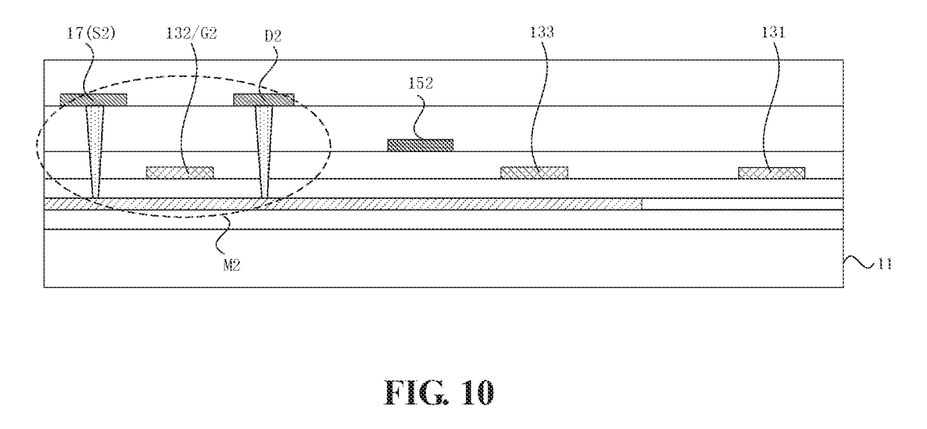
FIG. 10 is a sectional view taken along a line D-D' of FIG. 3.

Specifically, referring to FIG. 3, FIG. 4 and FIG. 6, the display assembly includes the base substrate 11, a plurality of pixel units 12 disposed on one side of the base substrate and a first scanning line 131 extending along the first direction. Each of the plurality of pixel units 12 includes a pixel driving unit 40 and a light-emitting unit disposed on one side of the pixel driving unit 40 and the light-emitting unit facing away from the base substrate, and the light-emitting unit includes a metal anode 14. The pixel driving unit 40 includes a light-emitting reset transistor M7 configured to provide an initial voltage for a light-emitting unit 19 before the display stage. The light-emitting reset transistor M7 includes a gate electrode G7 electrically connected to the first scanning line 131, a drain electrode D7 electrically connected to the reference voltage and a source electrode S7 electrically connected to the metal anode 14. The display panel 01 further includes a reference voltage line (not shown in the figure) extending along the first direction X, which is configured to provide a reference voltage Vref. The light-emitting control signal line 133 is electrically connected to a gate electrode (including a gate electrode G1 of the first light-emitting control transistor M1 and a gate electrode G6 of the second light-emitting control transistor M6) of the light-emitting control transistor, a drain electrode D1 of the first light-emitting control transistor M1 is electrically connected to the second power signal line 152, a drain electrode D6 of the second light-emitting control transistor M6 is electrically connected to a metal anode 14 of the light-emitting unit 19 and a source electrode S7 of the light-emitting reset transistor M7, a drain electrode D3 of the driving transistor M3 is electrically connected to a source electrode S6 of the second light-emitting control transistor M6, a source electrode S3 of the driving transistor M3 is electrically connected to a source electrode S1 of the first light-emitting control transistor M1, and a gate electrode G3 of the driving transistor M3 is electrically connected to a second plate Cst2 of the storage capacitor Cst. Optionally, the gate electrode G3 of the driving transistor M3 is reused as the second plate Cst2 of the storage capacitor Cst. The shield electrode 16 and a first plate Cst1 of the storage capacitor Cst are located in a same layer. The first plate Cst1 of the storage capacitor Cst is electrically connected to the first power signal line 151. Referring to FIG. 3, FIG. 4, FIG. 8 and FIG. 9, a gate electrode G5 of the memory cell reset transistor M5 is electrically connected to the first scanning line 131. Optionally, the first scanning line 131 and the gate electrode G5 of the memory cell reset transistor M5 may be disposed in a same layer. A drain electrode D5 of the memory cell reset transistor M5 is electrically connected to the source electrode S7 of the light-emitting reset transistor M7 (the drain electrode D5 of the memory cell reset transistor M5 in a first row is electronically connected to the reference voltage line) of a prior stage (a prior row), and a source electrode S5 of the memory cell reset transistor M5 is electrically connected to a drain electrode D4 of an additional transistor M4. A source electrode S4 of the additional transistor M4 is electrically connected to the drain electrode D3 of the driving transistor M3 and the source electrode S6 of the second light-emitting control transistor M6, and a gate electrode G4 of the additional transistor M4 is electrically connected to the second scanning line 132. Referring to FIG. 3, FIG. 4 and FIG. 10, a gate electrode G2 of the data signal writing transistor M2 is electrically connected to the second scanning line 132, a source electrode S2 of the data signal writing transistor M2 is electrically connected to the data line 17, and a drain electrode D2 of the data signal writing transistor M2 is electrically connected to the source electrode S3 of the driving transistor M3. In one embodiment, the memory cell reset transistor M5 and the additional transistor M4 may be a dual-gate transistor. In this embodiment, for transistors M1-M7 as circled in FIG. 3, the gate electrode G7 of the light-emitting reset transistor M7 is electrically connected to the first scanning line 131 in a next row, the first scanning line 131 in the next row is electrically connected to the second scanning line 132 in a current row. Therefore, for the current row, the gate electrode G7 of the light-emitting reset transistor M7 is electrically connected to the second scanning line 132 in the current row.

Figure 5:
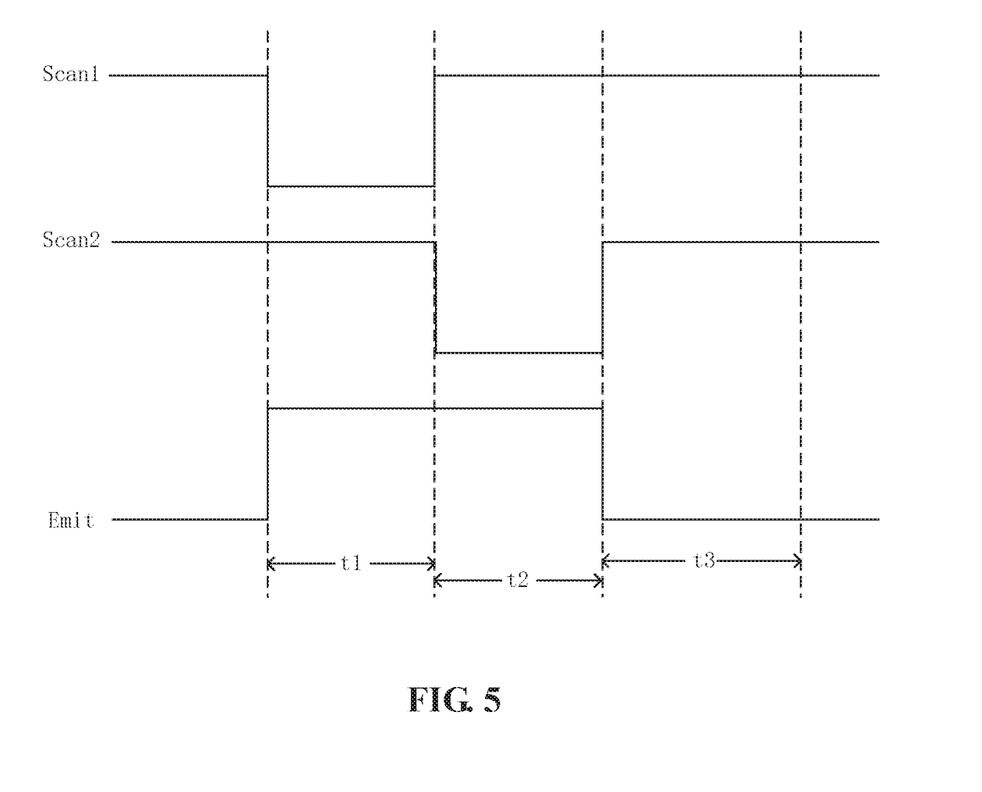
FIG. 5 is a driving timing graph of a pixel driving unit according to an embodiment of the present disclosure.

FIG. 5 is a driving timing graph of a pixel driving unit according to an embodiment of the present disclosure. Each of the transistors M1-M7 described above may be a P-type transistor or an N-type transistor, and no limitations are made for it in the present disclosure. Exemplarily, a detailed description on working principles of the pixel driving unit is given by taking a case that the transistors M1-M7 are P-type transistors and a reference voltage signal is a signal at logic low-level as an example:

In a time period t1 (an initial stage), a signal Scan1 in the first scanning line 131 is in a logic low-level state, a signal Scan2 in the second scanning line 132 and a signal Emit in the light-emitting control signal line 133 are in a logic high-level state. At the moment, the memory cell reset transistor M5 is turned on. Taking the pixel driving unit in a first row as an example, a potential Vref of a reference voltage signal line is applied to the second plate Cst2 of the storage capacitor Cst via the memory cell reset transistor M5. That is, a potential of a first node N1 is the reference voltage Vref. At the moment, a potential of the gate electrode G3 of the driving transistor M3 is also the reference voltage Vref.

In a time period t2 (a data signal voltage writing stage), the signal Scan2 in the second scanning line 132 is in a logic low-level state, the signal Scan1 in the first scanning line 131 and the signal Emit in the light-emitting control signal line 133 are in a logic high-level state. At the moment, the data signal writing transistor M2 and the additional transistor M4 are turned on. At the same time, the potential of the gate electrode G3 of the driving transistor M3 is the reference voltage Vref, which is also a low potential, and the driving transistor M3 is also turned on. A data signal Vdata in the data line 17 is applied to the first node N1 via the data signal writing transistor M2, the driving transistor M3 and the additional transistor M4, and the potential of the first node N1 is gradually pulled up by the potential of the data line 17. When a gate voltage of the driving transistor M3 is pulled up to a voltage that a voltage difference between the source voltage and said voltage is not larger than a threshold voltage $V_{th}$ of the driving transistor M3, the driving transistor M3 will be in a cut-off state. Since the source electrode S3 of the driving transistor M3 is electrically connected to the data line 17 via the data signal writing transistor M2, a potential $V_{data}$ of the source electrode S3 of the driving transistor M3 maintains unchanged. Thus, when the driving transistor M3 is cut off, the potential of the gate electrode G3 of the driving transistor M3 is $V_{data}-|V_{th}|$, where $V_{data}$ is a value of the voltage in the data line and $|V_{th}|$ is a threshold voltage of the driving transistor M3.

At the moment, a voltage difference Vc between the first plate Cst1 and the second electrode Cst2 of the storage capacitor Cst is:

$$Vc = V1 - V2 = V_{PVDD} - (V_{data} - |V_{th}|).$$

Where V1 represents the potential of the first plate Cst1, V2 represents the potential of the second plate Cst2, and $V_{PVDD}$ is a voltage value of a power signal in the first power signal line 151.

In the data signal voltage writing stage, the voltage difference Vc between the first plate Cst1 and the second plate Cst2 of the storage capacitor Cst includes the threshold voltage $|V_{th}|$ of the driving transistor M3. That is, at the data signal voltage writing stage, the threshold voltage $V_{th}$ of the driving transistor M3 is detected and stored in the storage capacitor Cst.

The potential of the reference voltage signal line is applied to a first electrode of a light-emitting component via the light-emitting reset transistor M7, a potential of the first electrode of the light-emitting component is initialized so as to decrease the influence of a voltage of the light-emitting component in a previous frame on a voltage of the light-emitting component in a next frame. Therefore, the homogeneity of display is further improved.

In a time period t3 (a light-emitting stage), the signal Emit in the light-emitting control signal line 133 is in a logic low-level state, the signal Scan1 in the first scanning line 131 and the signal Scan2 in the second scanning line 132 are in a logic high-level state. At the moment, the first light-emitting control transistor M1 and the second light-emitting control transistor M6 are turned on, the voltage of the source electrode S3 of the driving transistor M3 is $V_{PVDD}$, and a voltage difference between the source electrode and the gate electrode of the driving transistor M3 is:

$$V_{sg} = V_{PVDD} - (V_{data} - |V_{th}|).$$

The light-emitting unit 19 is driven by a drain current of the driving transistor M3 to emit light, and the current of the driving transistor $I_d$ satisfies the following formula:

$$I_d = \frac{1}{2}\mu C_{ox}\frac{W}{L}(V_{sg} - |V_{th}|)^2 =$$
$$\frac{1}{2}\mu C_{ox}\frac{W}{L}(V_{PVDD} - V_{data} + |V_{th}| - |V_{th}|)^2 = \frac{1}{2}\mu C_{ox}\frac{W}{L}(V_{PVDD} - V_{data})^2$$

where μ is a mobility of carriers of the driving transistor M3, W and L are respectively a length and a width of a channel of the first light-emitting control transistor M1 and the second light-emitting control transistor M6, $C_{ox}$ is a capacitance of a gate oxide of the driving transistor M3 in an unit area, $V_{PVDD}$ is a voltage value in the first power signal line 151, and $V_{data}$ is a voltage value in the data line 17.

During the above-mentioned operation of the pixel driving unit driving the light-emitting unit, due to the arrangement of the shield electrode 16, two equivalent capacitors are formed between the first scanning line 131 and a second node N2, and the two equivalent capacitors are respectively a first equivalent capacitor C1 and a second equivalent capacitance C2. In one embodiment, the first equivalent capacitor C1 is formed between the second node N2 and the shield electrode 16, and the second equivalent capacitor C2 is formed between the shield electrode 16 and the first scanning line 131.

At the moment, a fixed potential is applied to the shield electrode 16, so that a potential of the second node N2 is also fixed. That is, the potential of the second node N2 is not affected by potential changes in the first scanning line 131, so that a capacitive coupling between the first scanning line 131 and the metal anode 14 is decreased so as to weaken the influence of potential changes in the first scanning line on the brightness and darkness of the light-emitting unit, and solve the problem in which the display panel is not dark in the dark state and the sub-pixels are unexpectedly lighted caused by the capacitive coupling between the first scanning line and the metal anode, thereby improving the image display effect of the display panel.

Figure 7:
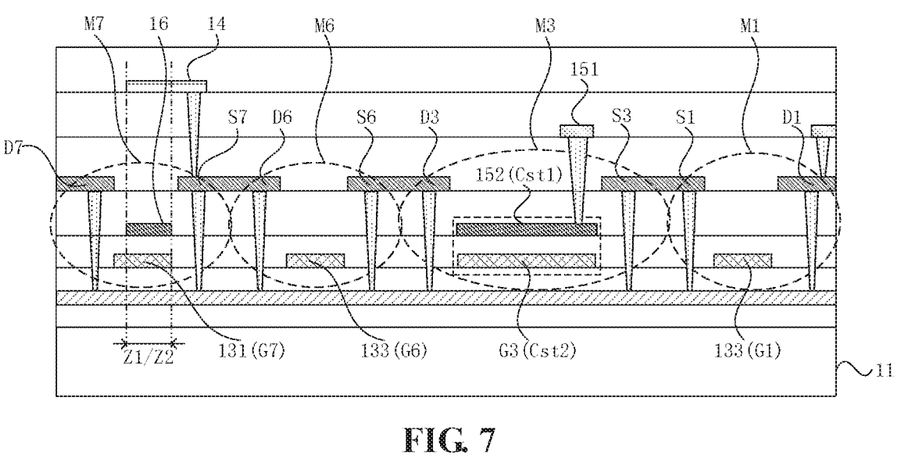
FIG. 7 is a sectional view of a structure of another display panel according to an embodiment of the present disclosure.

Optionally, referring to FIG. 7, an overlapping area Z1 is completely covered by a vertical projection Z2 of the shield electrode 16 on the base substrate 11. In such way, the potential of the second node N2, that is, the potential of the metal anode 14, may be completely unaffected by the second scanning line 132, further improving the image display effect of the display panel.

Optionally, referring to FIG. 6 or FIG. 7, the shield electrode 16 and the reference voltage line are disposed in a same layer. In such way, in one aspect, film layers to be disposed on the display panel may be reduced, and the absorption of light by each of film layers may be reduced, thereby increasing the light intensity received by the fingerprint recognition unit and increasing the strength of the fingerprint recognition signal. Therefore, the accuracy of the fingerprint recognition may be improved. In another aspect, both the design difficulty and the manufacturing process of the display panel may be simplified.

Figure 8:
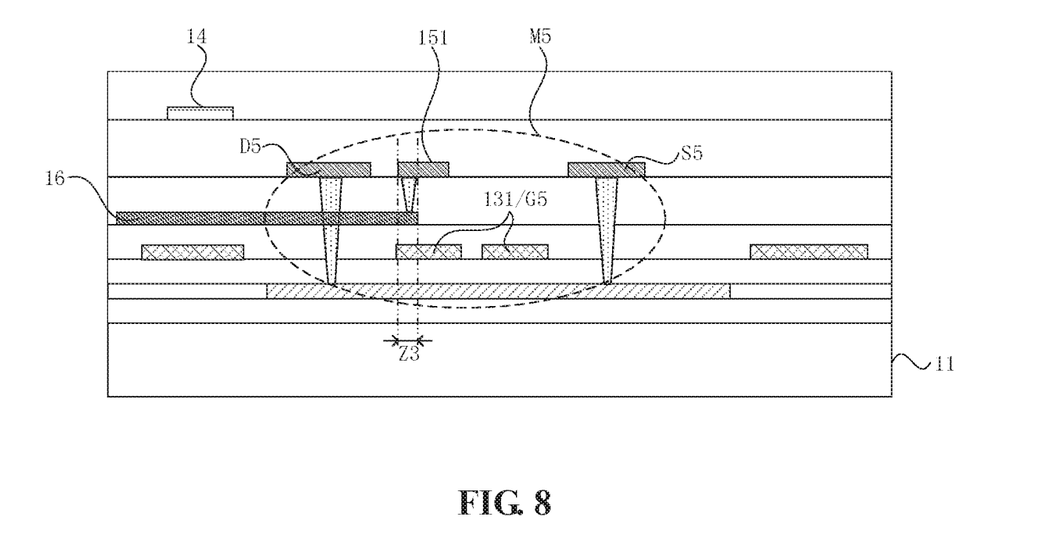
FIG. 8 is a sectional view taken along a line B-B' of FIG. 3.
Figure 9:
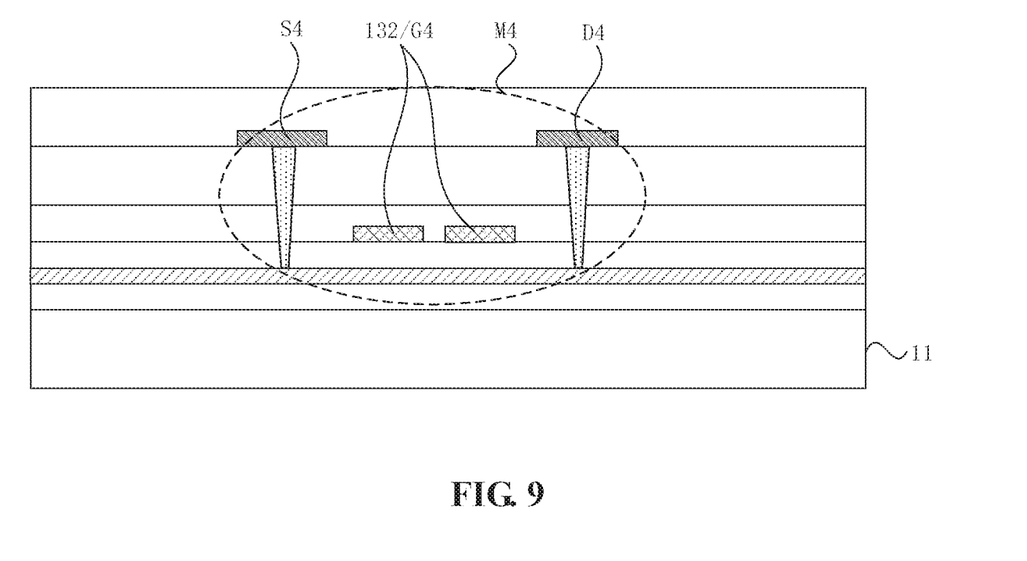
FIG. 9 is a sectional view taken along a line C-C' of FIG. 3.

Optionally, referring to FIG. 3, FIG. 4 and FIG. 8, the display panel 01 further includes a first power signal line 151 extending along a second direction Y, the shield electrode 16 is electrically connected to the first power signal line 151, and the second direction Y is intersected with the first direction X.

In such a way, a first power signal PVDD in the first power signal line 151 is applied to the shield electrode 16, so that an extra power signal of the shield electrode 16 is not required to be configured. Therefore, the manufacturing and design difficulty and the manufacturing process of the display panel may be further simplified.

Optionally, still referring to FIG. 8, the first power signal line 151 and the drain electrode D5 are disposed in the same layer.

In one embodiment, the drain electrode and source electrode of each transistor (including the light-emitting reset transistor M7, memory cell reset transistor M5, driving transistor M3, first light-emitting control transistor M1, second light-emitting control transistor M6, data signal writing transistor M2, and additional transistor M4) included in the pixel driving unit may be located in the same film layer. The operation to dispose the first power signal line 151 and the drain electrode in the same film layer, in one aspect, may reduce film layers to be disposed on the display panel and the absorption of light by each of film layers, so that the light intensity received by the fingerprint recognition unit is increased and the strength of the fingerprint recognition signal is increased, thereby improving the accuracy of the fingerprint recognition, and in another aspect, both the design difficulty and the manufacturing process of the display panel may be simplified.

Optionally, still referring to FIG. 8, the vertical projection of the shield electrode 16 on the base substrate 11 is overlapped with a vertical projection of the first power signal line 151 on the base substrate 11, for example, to form an overlapping area Z3, and the shield electrode 16 is electrically connected to the first power signal line 151 via a via hole.

Exemplarily, a via hole may be formed in a region corresponding to the overlapping area Z3, and the first power signal line 151 is electrically connected to the shield electrode 16 to form a transmission path for the first power signal PVDD to be transmitted from the first power signal line 151 to the shield electrode 16. In such a way, the area of a vertical projection of a via hole area on the base substrate 11 may be reduced. That is, the light-shielding area of a via hole portion on the display panel may be reduced by forming the via hole in the overlapping area, so that a relatively large light transmittance area is ensured while disposing the shield electrode, thereby ensuring the accuracy of the fingerprint recognition of the display panel while improving the image display effect of the display panel.

Optionally, part of the first scanning line 131 is reused as the gate electrode G7.

In addition, part of the first scanning line 131 may be further reused as the gate electrode G1 and the gate electrode G5, part of the second scanning line 132 may be reused as the gate electrode G2 and the gate electrode G4; and part of the light-emitting control signal line 133 may be reused as the gate electrode G6.

In such way, in an aspect, wires to be configured may be reduced, the design difficulty of the display panel may be decreased, and the manufacturing process of the display panel may be simplified. In another aspect, the loss of the first scanning signal, the second scanning signal and the light-emitting control signal during the transmission process may be reduced, and the precise transmission of the first scanning signal, the second scanning signal and the light-emitting control signal may be achieved, thereby further improving the image display effect of the display panel.

Optionally, referring to FIG. 10, the first scanning line 131, the second scanning line 132 and the light-emitting control signal line 133 are located in a same layer and distributed in a cyclic manner.

The first scanning line 131, the second scanning line 132, and the light-emitting control signal line 133 may be formed in a same process through a mask evaporation method or an etching-after-evaporation method, thereby simplifying the manufacturing process of the display panel and decreasing the manufacturing difficulty.

Figure 11:
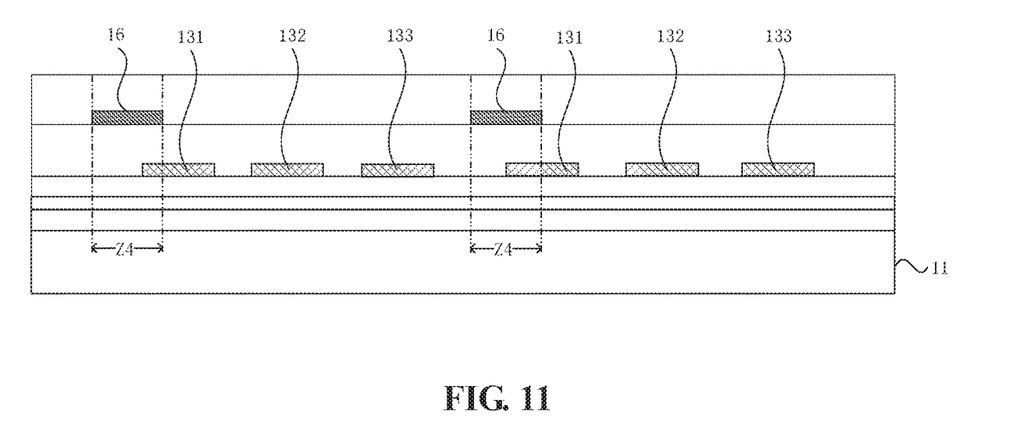
FIG. 11 is a sectional view of a structure of another display panel according to an embodiment of the present disclosure.

Optionally, referring to FIG. 11, the vertical projection (shown as Z4 in FIG. 11) of the shield electrode 16 on the base substrate 11 is not overlapped with vertical projections of the second scanning line 132 and the light-emitting control signal line 133 on the base substrate.

In this way, while decreasing the capacitive coupling between the first scanning line 131 and the metal anode 14 via the shield electrode 16, a relatively large light transmission area of the display panel is ensured, so as to improve the image display effect of the display panel while ensuring the accuracy of the fingerprint recognition of the display panel.

Optionally, still referring to FIG. 3 and FIG. 6, the display panel 01 further includes a second power signal line 152 extending along a first direction X, the first power signal line 151 and the second power signal line 152 are disposed in different layers and the first power signal line 151 is electrically connected to the second power signal line 152 via a via hole. Therefore, the first power signal line 151 and the second power signal line 152 are intersected to form a mess structure, the resistance of the whole power signal line is reduced, so that the influence of uneven voltage drops in different positions of the display panel on the image display effect of the display panel is decreased, power signals in the whole display panel are enabled to be evenly distributed and a power voltage of each of the pixel driving units has a similar value. Therefore, an uneven display problem of the display panel has been improved, that is, the display effect of the display panel is improved.

Figure 12:
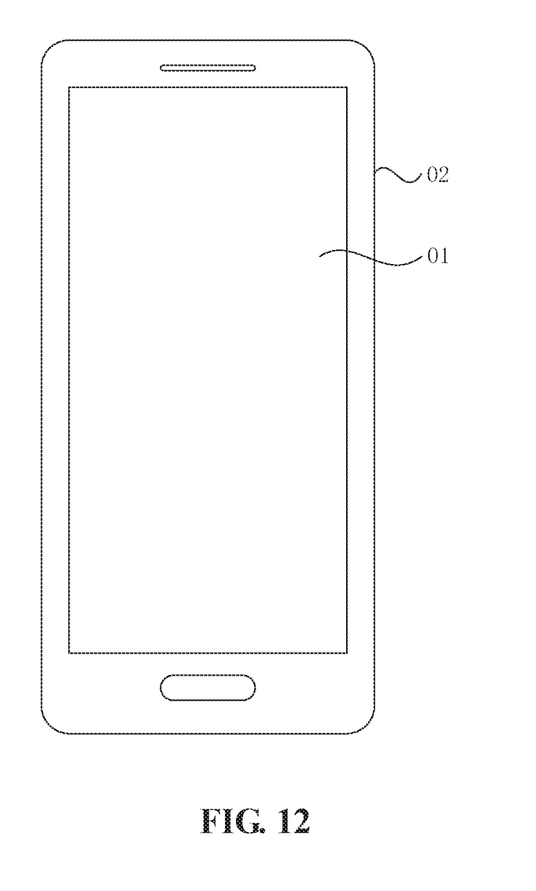
FIG. 12 is a structural diagram showing a display device according to an embodiment of the present disclosure.

A display device is further provided by the present disclosure. FIG. 12 is a structural diagram showing a display device according to an embodiment of the present disclosure. As shown in FIG. 12, the display device 02 includes the display panel 01 described in any one of embodiments of the present disclosure.

Exemplarily, the display device 02 may include a display apparatus, e.g. a mobile phone, a computer and a smart wearable device, and no limitations are made thereto.

Since the display device provided by the present disclosure includes the above-mentioned display panel, the display device has beneficial effects of the above-mentioned display panel, and details about that are not described here again.

It is to be noted that the above are only preferred embodiments of the present disclosure and the technical principles used therein. It will be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising:
a display assembly, wherein the display assembly comprises a base substrate, a plurality of pixel units disposed on a first side of the base substrate and a first scanning line extending along a first direction, wherein each of the plurality of pixel units comprises a pixel driving unit and a light-emitting unit disposed on one side of the pixel driving unit facing away from the base substrate, wherein the light-emitting unit comprises a metal anode; and
a fingerprint recognition assembly disposed on a second side of the base substrate, wherein the second side is one side of the base substrate facing away from the plurality of pixel units and the second side is opposite to the first side, the fingerprint recognition assembly comprises at least one fingerprint recognition unit, and the at least one fingerprint recognition unit is configured to perform fingerprint recognition according to light reflected by a touch object to the fingerprint recognition unit;
wherein the pixel driving unit comprises a light-emitting reset transistor, the light-emitting reset transistor is configured to provide an initial voltage for the light-emitting unit before a display stage, wherein the light-emitting reset transistor comprises a gate electrode electrically connected to the first scanning line, a drain electrode electrically connected to a reference voltage, and a source electrode electrically connected to the metal anode, wherein a vertical projection of the first scanning line on the base substrate and a vertical projection of the metal anode on the base substrate have an overlapping area; and
the display panel further comprises a shield electrode disposed between a film layer in which the first scanning line is located and a film layer in which the drain electrode is located, wherein the shield electrode is connected to one fixed potential, the shield electrode is insulated from the drain electrode, and a vertical projection of the shield electrode on the base substrate is overlapped with the overlapping area.

2. The display panel according to claim 1, wherein the overlapping area is completely covered by the vertical projection of the shield electrode on the base substrate.

3. The display panel according to claim 1, further comprising a reference voltage line extending along the first direction, the reference voltage line is configured to provide the reference voltage, wherein the shield electrode and the reference voltage line are located in a same layer.

4. The display panel according to claim 1, further comprising a first power signal line extending along a second direction, wherein the shield electrode is electrically connected to the first power signal line, and the second direction is intersected with the first direction.

5. The display panel according to claim 4, wherein the first power signal line and the drain electrode are disposed in a same layer.

6. The display panel according to claim 5, wherein the vertical projection of the shield electrode on the base substrate is overlapped with a vertical projection of the first power signal line on the base substrate, and the shield electrode is electrically connected to the first power signal line via a via hole.

7. The display panel according to claim 1, wherein part of the first scanning line is reused as the gate electrode.

8. The display panel according to claim 4, wherein the display panel further comprises a storage capacitor, a second scanning line extending along the first direction and a light-emitting control signal line, and wherein the pixel driving unit further comprises a data signal writing transistor, a driving transistor, a memory cell reset transistor and a light-emitting control transistor; wherein the first scanning line is electrically connected to a gate electrode of the memory cell reset transistor, the second scanning line is electrically connected to a gate electrode of the data signal writing transistor, the light-emitting control signal line is electrically connected to a gate electrode of the light-emitting control transistor, a first plate of the storage capacitor is electrically connected to the first power signal line, and a second plate of the storage capacitor is electrically connected to a gate electrode of the driving transistor; and the shield electrode and the first plate of the storage capacitor are disposed in a same layer.

9. The display panel according to claim 8, wherein the first scanning line, the second scanning line and the light-emitting control signal line are disposed in a same layer and distributed in a cyclic manner.

10. The display panel according to claim 8, wherein the vertical projection of the shield electrode on the base substrate is not overlapped with vertical projections of the second scanning line and the light-emitting control signal line on the base substrate.

11. The display panel according to claim 4, further comprising a second power signal line extending along the first direction, wherein the first power signal line and the second power signal line are disposed in different layers and the first power signal line is electrically connected to the second power signal line via a via hole.

12. The display panel according to claim 1, wherein the light-emitting unit provides a light source for the fingerprint recognition assembly, and the fingerprint recognition unit is configured to perform fingerprint recognition according to light emitted from the light-emitting unit and reflected by the touch object to the fingerprint recognition unit.

13. The display panel according to claim 1, further comprising: a fingerprint recognition light source, wherein the fingerprint recognition light source is disposed on one side of the fingerprint recognition assembly facing away from the base substrate; wherein light emitted from the fingerprint recognition light source is irradiated to the touch object via a gap between two adjacent fingerprint recognition units of the at least one recognition unit, and the fingerprint recognition unit is configured to perform fingerprint recognition according to light emitted from the fingerprint recognition light source and reflected by the touch object to the fingerprint recognition unit.

14. The display panel according to claim 13, wherein the fingerprint recognition light source is a collimated light source.

15. A display device, comprising a display panel, wherein the display panel comprises:

a display assembly, wherein the display assembly comprises a base substrate, a plurality of pixel units disposed on a first side of the base substrate and a first scanning line extending along a first direction, wherein each of the plurality of pixel units comprises a pixel driving unit and a light-emitting unit disposed on one side of the pixel driving unit facing away from the base substrate, wherein the light-emitting unit comprises a metal anode; and a fingerprint recognition assembly disposed on a second side of the base substrate, wherein the second side is one side of the base substrate facing away from the plurality of pixel units and the second side is opposite to the first side, the fingerprint recognition assembly comprises at least one fingerprint recognition unit, and the at least one fingerprint recognition unit is configured to perform fingerprint recognition according to light reflected by a touch object to the fingerprint recognition unit;

wherein the pixel driving unit comprises a light-emitting reset transistor, the light-emitting reset transistor is configured to provide an initial voltage for the light-emitting unit before a display stage, wherein the light-emitting reset transistor comprises a gate electrode electrically connected to the first scanning line, a drain electrode electrically connected to a reference voltage, and a source electrode electrically connected to the metal anode, wherein a vertical projection of the first scanning line on the base substrate and a vertical projection of the metal anode on the base substrate have an overlapping area; and the display panel further comprises a shield electrode disposed between a film layer in which the first scanning line is located and a film layer in which the drain electrode is located, wherein the shield electrode is connected to one fixed potential, the shield electrode is insulated from the drain electrode, and a vertical projection of the shield electrode on the base substrate is overlapped with the overlapping area.

\* \* \* \* \*